(12) United States Patent
Vindt et al.

(10) Patent No.: US 10,685,790 B2
(45) Date of Patent: Jun. 16, 2020

(54) SUPERCAPACITOR AND A METHOD FOR EXPANDING THE VOLTAGE RANGE OF AN AQUEOUS ELECTROLYTE SUPRCAPACITOR

(71) Applicant: INNOCELL APS, Svendborg (DK)

(72) Inventors: Steffen Thrane Vindt, Ørbaek (DK); Peter Brilner Lund, Ringe (DK); Eivind Skou, Odense SØ (DK); Shuang Ma Andersen, Odense S (DK); Steen Yde-Andersen, Svendborg (DK); Jørgen Scherning Lundsgaard, Svendborg (DK)

(73) Assignee: INNOCELL APS, Svendborg (DK)

( * ) Notice: Subject to any disclaimer, the term of this patent is extended or adjusted under 35 U.S.C. 154(b) by 0 days.

(21) Appl. No.: 16/308,846

(22) PCT Filed: Jun. 28, 2017

(86) PCT No.: PCT/DK2017/050214
§ 371 (c)(1),
(2) Date: Dec. 11, 2018

(87) PCT Pub. No.: WO2018/001430
PCT Pub. Date: Jan. 4, 2018

(65) Prior Publication Data
US 2019/0311862 A1     Oct. 10, 2019

(30) Foreign Application Priority Data

Oct. 27, 2016 (EP) ..................... 16196006

(51) Int. Cl.
*H01G 11/56* (2013.01)
*H01G 11/60* (2013.01)
*H01G 11/62* (2013.01)
*H01G 11/32* (2013.01)

(52) U.S. Cl.
CPC ............. *H01G 11/56* (2013.01); *H01G 11/60* (2013.01); *H01G 11/62* (2013.01); *H01G 11/32* (2013.01); *Y02E 60/13* (2013.01)

(58) Field of Classification Search
CPC ........ H01G 11/26; H01G 11/46; H01G 11/48; H01G 11/36; H01G 11/24; H01G 11/86; H01G 11/56; H01G 11/60; H01G 11/62; H01G 11/32; Y02E 60/13
See application file for complete search history.

(56) References Cited

U.S. PATENT DOCUMENTS

| | | | | |
|---|---|---|---|---|
| 2013/0302275 A1* | 11/2013 | Wei | ........................ | A61K 38/28 424/85.2 |
| 2014/0308544 A1* | 10/2014 | Wessells | ................ | H01M 10/36 429/50 |
| 2016/0211539 A1* | 7/2016 | Goeltz | .................... | H01M 8/20 |

OTHER PUBLICATIONS

International Search Report and Written Opinion in PCT/DK2017/050214 dated Jul. 21, 2017.
Xu et al. "Preparing two-dimensional microporous carbon from Pistachio nutshell with high areal capacitance as supercapacitor materials" Scientific reports 2014 4:5545 pp. 1-6.

* cited by examiner

*Primary Examiner* — Michael P McFadden
(74) *Attorney, Agent, or Firm* — Licata & Tyrrell P.C.

(57) ABSTRACT

The present invention relates to a supercapacitor and a method for expanding the voltage range of an aqueous electrolyte supercapacitor.

15 Claims, 4 Drawing Sheets

SUPERCAPACITOR AND A METHOD FOR EXPANDING THE VOLTAGE RANGE OF AN AQUEOUS ELECTROLYTE SUPRCAPACITOR

This patent application is the National Stage of International Application No. PCT/DK2017/050214 filed Jun. 28, 2017, which claims the benefit of priority from EP 16196006.7 filed Oct. 27, 2016 and DK PA 2016 70466 filed Jun. 29, 2016, each of which is incorporated by reference in its entirety.

FIELD OF THE INVENTION

The present invention relates to a supercapacitor and a method for expanding the voltage range of an aqueous electrolyte supercapacitor.

BACKGROUND OF THE INVENTION

The consumption of electricity has to be perfectly matched with generation of electricity at any moment in time. This balance is necessary in any electricity grid to maintain a stable and safe electricity supply. Energy storage can help deal with fluctuations in demand and generation by allowing excess electricity to be 'saved' for periods of higher electricity demand.

Energy storage can contribute to a better use of renewable energy in the electricity system since it can store energy produced when the conditions for renewable energy are good but demand may be low.

Indeed there is a need for effective way of storing electricity.

Examples of existing technologies for electrical energy storage are: batteries, the combination of fuel cells and electrolysers, supercapacitors, flywheels, superconducting magnets, compressed air and pumped hydroelectric storage. Within these technologies development of supercapacitors for cost-effective energy storage are one of the most promising technologies for providing an effective way of storing electricity. The term supercapacitor, also known as ultracapacitor, electrochemical capacitor or electrical double-layer capacitor (EDLC), covers a wide range of different devices.

A supercapacitor is a special class of capacitors characterized by extremely high specific capacitances compared to regular capacitor. Traditionally supercapacitors achieve extremely high specific capacitances by utilization of charge storage in the double-layer interface between a porous electrode and a liquid electrolyte solution. This technology has several advantages over batteries and other common technologies for storage of electrical energy where extremely high power density and long device life time are some of the most important. The high power density of supercapacitors gives them an ability to be charged much faster than batteries and it allows them to deliver much more power to a load compared to a similar sized battery.

Typically supercapacitors have higher power density, cyclability, shelf life and energy efficiency but lower energy density than batteries. Because of these attributes there are several applications where supercapacitors are preferred over batteries especially because of their ability to charge and discharge much faster than batteries. However, their lower energy density can be problematic especially for mobile applications and finding ways of increasing this is therefore an important research goal. For stationary applications on the other hand the energy density is less important in itself and instead parameters like energy storage economy both during operation and overall in the life time of the device are more important. Because of supercapacitors high energy efficiency and operational life time they have potential to become a very cost-effective energy storage technology. Evaluation of the total storage economy of a device is not a trivial matter but generally it must be the ratio between the cost saving due to recovered electrical energy and the cost of the device. The long service life of a supercapacitor means that more electricity can be stored during its lifetime and its high energy efficiency means that a high degree of the stored electricity is recovered.

Therefore there is a need for developments of supercapacitors to maximize storing capacity and minimize costs.

OBJECT OF THE INVENTION

An object of the present invention is to develop cost-effective supercapacitors for energy storage.

Another object of the invention may be seen as to improve carbon based electrode for use in a supercapacitor.

A further object of the present invention may be seen as to provide an alternative to the prior art.

In particular, it may be seen as a further object of the present invention to provide an improved supercapacitor that solves the above mentioned problems of the prior art by widening the electrochemical stability window of an electrolyte for use in supercapacitor.

SUMMARY OF THE INVENTION

The above described object and several other objects are intended to be obtained in an aspect of the invention by a supercapacitor comprising an electrolyte, the electrolyte comprising a mixture of water, one or more non-aqueous solvent and a salt forming a mixture of an aqueous solution and a non-aqueous solution; wherein the non-aqueous solution has a larger electrochemical stability window than said aqueous solution;

the salt has a solubility above 0.1M in water and/or in the one or more non-aqueous solvent between −25 and 100° C.;

the mixture has a buffer capacity $\beta$ lower than $10^{-5}$;

hydron ($H^+$) and hydroxide ion ($OH^-$) solubility is lower in the non-aqueous solution than in the aqueous solution.

The invention addresses the need of improving supercapacitor performance by widening the electrochemical stability window of an electrolyte for use in supercapacitor.

The invention stems from the inventors observation that double-layer capacitors based on neutral aqueous electrolytes can have significantly wider usable potential windows than those based on acidic or alkaline electrolytes. This effect is explained by a local pH change taking place at the electrode surfaces, leading to a change in the redox potential of water in opposite directions on the two electrodes, resulting in the wider stability window.

When a supercapacitor is charged the anionic and cationic currents lead to accumulation of anions at the positively charged electrode and cations at the negatively charged electrode. This would happen even in the extreme case of a single ionic species conducting the full current because this species would be depleted at one electrode leaving the other ionic species behind and accumulating at the other electrode where it displaces the other species. The accumulation of ionic species at the electrodes with opposite charge of the electrodes is what creates the charge storage capacity of the supercapacitor.

The electrolyte is generally a compound that dissociates into ions when dissolved, either fully in case of strong electrolytes or only partially in case of weak electrolytes. Generally in electrochemical devices the electrolyte medium (solution), either liquid or solid, that facilitates the electrical conduction, via ionic transport, is called the support electrolyte or sometimes just the electrolyte as shorthand. As a result the term "electrolyte" can either be used to denote the pure electrolyte or a medium containing this. The electrolyte is a crucial part of a supercapacitor, it is the electrolyte that forms part of the double-layer when the capacitor is charged and it is the electrolyte that connects the two electrodes of the supercapacitor electrically.

In the terminology of supercapacitors it is common to classify supercapacitors by the type of electrolyte they use because of the large impact the electrolyte solution has on the performance of the supercapacitor. The electrochemical stability of the electrolyte solution sets the limit for the maximum charge voltage the capacitor can handle and ionic conductivity is usually the largest contributor to the equivalent series resistance (ESR) and therefore the limiting factor of the maximum power density of the capacitor. Generally there are three classes of electrolytes, aqueous electrolytes which use water as solvent, organic electrolytes where the solvent is an organic but typically polar solvent and ionic liquids which are liquid salts that contain no solvent.

Traditional aqueous electrolytes have the advantage of high conductivity, they usually give high specific capacitances and they are low cost materials. Furthermore they allow for a wide range of pseudocapacitive reactions and they are non-flammable. Unfortunately they have a very limited voltage ranges because of the small electrochemical stability window of water (1.23 V) which results in low energy density of the resulting system.

Organic electrolyte supercapacitors are the most common commercial type of supercapacitor. They generally use either acetonitrile, propylene carbonate or a mixture of these as solvent and typically tetraethylammonium tetrafluoroborate as electrolyte. The main advantage of this type of electrolyte is that it allows for charge voltages of up to 2.5-2.8 V. The disadvantages of this type of electrolyte compared to the aqueous ones are lower conductivity, lower resulting specific capacitances and higher material and production costs.

Indeed, the range of useable potentials or the useable potentials window of a supercapacitor has a great impact on the amount of energy which can be stored in a supercapacitor.

Thus, there is an interest in widening the useable potentials window or the electrochemical stability window so as to improve supercapacitors performance.

The electrochemical stability window of an electrolyte is the window, i.e. the range, of potentials in which electrochemical processes can occur without being influenced by solvent degenerative chemical reactions occurring at the solvent, i.e. the range of useable potential of the electrolyte.

The invention, through an optimized combination of aqueous solution and non-aqueous solution having larger electrochemical stability window than the aqueous solution, achieves a widening of the range of usable potentials in a supercapacitor.

Electrolyte

The electrolyte of the invention, comprising a mixture of water, one or more non-aqueous solvent and a salt forming a mixture of an aqueous solution and a non-aqueous solution may also be referred to as hybrid electrolyte.

In some embodiments, the same salt is present in the aqueous and non-aqueous phase.

In some other embodiments, for example in case of a phase separated system, i.e. when the two liquids are immiscible, different salts may be present in the aqueous and in the non-aqueous phase.

Indeed, the non-aqueous phase and aqueous phase of the electrolyte may comprise different salts.

Salt solubility in the range above 0.1M is referred to solubility in the respective solutions, i.e. in the aqueous solution and a non-aqueous solution.

The salt solubility in the range above 0.1M is referred to as the salt solubility in working temperature range of the supercapacitor, i.e. between −25 and 100° C., for example between −25 and 70° C., such as between −10 and 50° C.

The working temperature range of the supercapacitor may be below and above the temperature limits mentioned above. The composition of the electrolyte-solvent mixture may thus be tuned so as to maintain the salt solubility in the range above 0.1M above and below the temperature limits cited above.

Preferably the salt concentration of the aqueous phase exceed the solubility limit of the pure organic solvent in order to increase the conductivity of the aqueous phase and to stabilize partial phase separation systems.

Buffer Capacity

The buffer capacity ($\beta$) describes the resistance of the solution towards pH change during the addition of an infinitesimal amount of strong base in moles per litre solution.

The buffer capacity ($\beta$) is defined as:

$$\beta = \frac{dn_B}{dpH} = -\frac{dn_A}{dpH}$$

and describes the resistance of the solution towards pH change during the addition of an infinitesimal amount of strong base ($n_B$) in moles per liter solution or opposite pH change during the addition a strong acid ($n_A$). Based on this a buffer capacity equation for any given buffer mixture which also takes the buffer capacity of water into account can be derived $$\beta = 2.303\left(\frac{K_w}{[H^+]} + [H^+] + \sum \frac{C_{Buffer} \cdot K_A \cdot [H^+]}{(K_A + [H^+])^2}\right)$$

where $K_W$ is the self-ionization constant of water, $K_A$ is the dissociation constant of a given buffer and $C_{Buffer}$ is the concentration of that buffer.

The inventors observed that a surprising expansion of useful potential window of the electrolyte is achieved by controlling the buffer capacity of the electrolyte, when the electrolyte being a mixture of water and one or more non-aqueous solvent and a salt having a solubility above 0.1M in both water and the one or more non-aqueous solvent, wherein the non-aqueous solvent has a larger electrochemical stability window than the aqueous solution.

This invention makes it possible to achieve dynamic performances comparable to the more expensive organic electrolytes while maintaining a lower cost as part of the electrolyte is aqueous.

According to the hypothesis of the inventors, if the concentration of water in the electrode-electrolyte interface could be reduced then the pH effect would be further amplified. The rationale behind this is that the formed hydroxide ions and protons which create the local pH changes would be diluted in a smaller amount of water and therefore their concentration would effectively become larger and so would the pH changes. However removing water from the interface is not a trivial task because for the ions to be able to form the crucial double-layer they need to be solvated.

In search for solutions, the inventors devised the invention by considering that another solvent, i.e. a non-aqueous solvent, might be able to partially replace water in the electrode-electrolyte interface.

Thus, in some further embodiments, the one or more non-aqueous solvent comprise polar organic solvent, such as propylene carbonate.

The one or more non-aqueous solvent may be an aprotic solvent. For example it may be an aprotic solvent with high molecular dipole moment, e.g. 4.9 D or higher.

The non-aqueous solvent need to be electrochemically stable in the potential window the electrodes are going to operate in and able to solvate the ions of the electrolyte. Furthermore, the non-aqueous solvent should not have any significant buffer capacity and the pH active species ($H_3O^+$, $H^+$ and $OH^-$) should have a lower solubility in or affinity for the non-aqueous solvent.

Other electrolytes having better performance either with regards to cost-effectiveness, electrochemical stability, specific affinity towards the electrode material, higher solubility of the chosen electrolyte, lower viscosity and therefore better conductivity, lower solubility of pH-active species may be used.

It was hypothesized that in a system with very low buffer capacity the limiting factor for the pH effect is not local pH stabilization by the buffer capacity of the electrolyte, binder or other components but rather diffusion of pH active species to and from the interface.

According to the inventors immobilization of the electrolyte, e.g. by the use of a gelling agent, could magnify the pH effect in an electrolyte where the buffer effect had been minimized.

Thus, in some embodiments, the electrolyte of the supercapacitor is or comprise a gel electrolyte.

The electrolyte may be an electrolyte solution immobilized with a gel, thus providing a quasi-solid state gel electrolyte supercapacitor.

The use of gel electrolyte may also have the general advantage of avoiding leaking, sealing problems and solvent evaporation.

When the electrolyte is in a gel form, the non-aqueous solution is in its highest concentration at the surface of the electrodes. In this way lower amounts of non-aqueous solution are necessary to broaden the range of useable potential of the electrolyte.

The addition of a gelling agent to both aqueous and non-aqueous phase in case of the combined hybrid electrolyte could in some cases improve the stability of the system further. A complete gelling of the electrolyte might also eliminate the need for a dedicated separator therefore making production simpler.

In some embodiments, the salt comprises cations selected from the group comprising alkali metal or alkaline metal earth, such as $Li^+$, $Na^+$, $K^+$, $Be^{2+}$, $Mg^{2+}$, $Ca^{2+}$, $Sr^{2+}$, or $NH^{4+}$ and ions selected from the group comprising $F^-$, $Cl^-$, $Br^-$, $I^-$, $NO_3^-$, $ClO_4^-$, $HSO_4^-$, $PF_6^-$, $BF_4^-$ and $SO_4^{2-}$.

In some further embodiments, the supercapacitor further comprises two electrodes and wherein the electrolyte is located between the two electrodes.

Electrodes may have a high surface area and high electrical conductivity, good electrochemical stability, low weight and relatively low price.

In some embodiments, the two electrodes are characterized by having a higher affinity towards the non-aqueous solution than towards the aqueous solution.

The two electrodes may be an anode and a cathode.

The higher affinity of the electrodes towards the non-aqueous solution may produce a concentration gradient of solutions where in the areas surrounding the electrodes non-aqueous solution molecules are in higher concentration than in areas far from the electrodes.

Indeed the effectiveness of the solvent addition is increased if the electrode materials have a specific affinity towards the solvent relative to water. A higher affinity of the electrode materials towards the solvent would lead to a local increase in the concentration of the solvent at the surface of the electrode and therefore a further decrease in water concentration in the electrode-electrolyte interface. In the extreme case if the specific affinity was high enough the solvent would completely displace water in the interface and the electrochemical stability of the system would no longer depend on water.

The electrodes according to the invention may comprise electrode materials suitable for electrochemical double-layer capacitors (EDLCs), i.e. having a high surface area and good electrical conductivity to maximize the amount of polarizable double-layer interface for a given amount of electrode material and therefore the specific capacitance.

Even in a condition in which the electrolyte of the invention comprises primary, i.e. in its majority, such as in an amount 50% or greater than the non-aqueous solution (% vol/vol), an aqueous solution, the higher affinity of the electrodes towards the non-aqueous solution produce a concentration gradient of solutions where in the areas surrounding the electrodes non-aqueous solution molecules are in higher concentration than in areas far from the electrodes.

In some embodiments the electrodes used, according to the invention may be carbon based electrodes.

In some embodiments, the electrodes used, according to the invention consist of carbon based material, i.e. contain only carbon based materials.

Carbon in its different allotropes may be used as electrode material in supercapacitors because of its good electrochemical stability, high electrical conductivity, low weight and relatively low price.

The carbon based electrodes may comprise carbon based materials such as carbon particles, nanotubes, aerogel or fibres, graphene, carbon black, activated carbon or carbides.

In some embodiments, the carbon based electrodes may comprise activated carbon electrode materials.

Activated carbon is a char which adsorptive properties has been enhanced by chemical activation, typically by reaction with gasses or salts.

Activated carbons typically have very high specific surface areas and they can be produced relatively cheap in large scale. The precursors for activated carbons can be both natural sources such as wood, nutshells or synthetic sources such as polymers and by-product from the oil industry.

Activation processes, according to the invention, provide high performance carbon based electrode materials having performance comparable to those of advanced graphene based materials while only using cheap abundant natural carbon precursors. This gives the possibility to create high performance supercapacitor electrode materials at a lower cost.

Carbon particles may be very fine particles of amorphous carbon such as carbon blacks.

Carbon blacks may be used as additive within the carbon based electrode as improving conductivity.

However the electrodes, according to the invention, have a majority, i.e. higher than 50%, of carbon materials having high surface area, such as activated carbon materials, graphene or carbide derivate, so as to achieve the desired effect, i.e. having an electrode with higher affinity towards the non-aqueous solution than towards the aqueous solution.

For example, the electrodes may have a majority, i.e. higher than 50%, of activated carbon materials graphene or carbide derivate so as to enhance the surface active area and thus achieve the desired effect, i.e. having an electrode with higher affinity towards the non-aqueous solution than towards the aqueous solution.

In some embodiments, the content of activated carbon materials graphene or carbide derivate is at least 70%, such as higher than 80%, for example 90% or 95%.

Carbon fibres can be of several different forms and chemical composition but generally they should contain at least 92 w % carbon.

Carbon aerogels are high surface area materials which are prepared by pyrolysis of organic aerogels.

Carbides or carbide derived carbons is a class of carbon materials synthesized by etching away the metal atoms in carbides thereby leaving a highly porous structure behind.

Thus the current invention may also be seen as developing cost-effective supercapacitors for energy storage, through the development of low cost high performance carbon based electrodes and via several fundamental improvements of aqueous type electrolytes high performance/low cost supercapacitor.

In some embodiments, the two electrodes are in contact with, such as surrounded by, the non-aqueous solution.

The higher affinity of the electrodes towards the non-aqueous solution, compared to the one towards the aqueous solution, lead to a concentration gradient of non-aqueous/aqueous solution with an higher concentration of non-aqueous solution surrounding the electrodes.

In some other embodiments, the two electrodes in contact with the non-aqueous solution are separated by said aqueous solution.

The system may thus be a super capacitor in which the electrolyte is formed by immiscible solutions having at least one of the two electrodes surrounded only by non-aqueous solution.

Due to the higher affinities towards non-aqueous electrolyte of the electrodes, the configuration of the super capacitor may be characterized by electrodes surrounded and in contact with non-aqueous solutions that are in turn surrounded by aqueous solutions.

In a second aspect, the invention relates to a method of increasing the voltage range of an aqueous electrolyte for use in a supercapacitor, the method comprising:
producing an electrolyte by mixing water, one or more non-aqueous solvent and a salt forming a mixture of an aqueous solution and a non-aqueous solution; wherein
the non-aqueous solution has a larger electrochemical stability window than the aqueous solution;
the salt has a solubility above 0.1M in water and/or in the one or more non-aqueous solvent between −25 and 100° C.;
the mixture has a buffer capacity R lower than $10^{-5}$;

hydron ($H^+$) and hydroxide ion ($OH^-$) solubility is lower in the non-aqueous solution than in the aqueous solution.

The voltage range of the aqueous electrolyte according to the invention can thus be increased leading to a supercapacitor with improved performance and lower cost.

In some other embodiments according to the second aspect of the invention, the method comprises:
producing an electrolyte by mixing water, one or more non-aqueous solvent and a salt forming a mixture of an aqueous solution and a non-aqueous solution.

Mixing may refer to combining both miscible or immiscible solvents.

In some other embodiments, the ratio vol/vol between the aqueous solution and said non-aqueous solution is 100:1.

The ratio vol/vol between the aqueous solution and the non-aqueous solution may be in the range between 100:1 and 1:100, such as 80:1, for example 60:1, 40:1, such as 20:1. In some embodiments, the ratio vol/vol between the aqueous solution and the non-aqueous solution was 1:1.

The ratio vol/vol between the aqueous solution and the non-aqueous solution may be in the range between 100:1 and 1:1, such as 80:1, for example 60:1, 40:1, such as 20:1.

In general, the electrolyte of the invention comprises primary, i.e. in its majority, of aqueous solution. The aqueous solution is purposefully present as majority, i.e. in an amount 50% or greater than the non-aqueous solution (% vol/vol).

In a third aspect, the invention relates to a carbon based electrode for use in a supercapacitor according to the first aspect of the invention, wherein said carbon electrode is characterized by having a higher affinity towards said non-aqueous solution than towards said aqueous solution.

In a forth aspect, the invention relates to a method of producing the carbon based electrode according to the third aspect of the invention, the method comprising: providing a carbon precursor, such as a structured source of cellulose or lignin; mechanically processing the structured source of cellulose or lignin; thermally processing the structured source of cellulose or lignin by exposing the structured source of cellulose or lignin to heat up to 300° C. for a desired period of time in inert atmosphere, thereby forming char; mechanically and chemically treating the char; activating the char by exposing the char to potassium hydroxide in presence of to heat up to 900° C. for a desired period of time in inert atmosphere, thereby forming activated carbon; cooling the activated carbon to room temperature; treating the activated carbon with water; and drying the activated carbon. Inert atmosphere may be in presence of argon gas.

Mechanical processing of the structured source of cellulose or lignin or mechanical treatment of the char may be performed by mashing or crushing, e.g. using a mortar and pestle or a ball mill.

Chemically treatment of the char may by achieved by exposure to chemicals such as a calcium chloride solution.

The desired period of time maybe in the range between few minutes, such as 2 minutes to one or more such as several hours, for example 3 hours or 90 minutes.

The structured source of cellulose or lignin may be a natural source such as a nut shell, for example a pistachio nut shell.

The structured source of cellulose or lignin may be a natural structured honeycomb and highly porous source of cellulose or lignin.

Pistachio nutshells from pistachio nuts are an example of natural structured honeycomb and highly porous source of cellulose or lignin.

Activation of the char may occur by using potassium hydroxide.

The use of potassium hydroxide as an activation agent has several advantages. It is the belief of the inventors that potassium ions are able to intercalate into graphitic domains of the carbon material thereby under the right conditions expanding these domains into individual graphene layers. Furthermore the hydroxide ions are able to oxidize and remove parts of the amorphous carbon structure leaving behind pores. The combination of these effects gives rise to an enormous increase in surface area.

The treatment according the fourth aspect of the invention provides a structure with high surface area with hydrophobic properties, thus having higher affinity towards non-aqueous solution than towards aqueous solutions.

According to another aspect, the invention relates to a method of producing high surface area, such as graphene structure, materials via a direct electrochemical reduction of graphene oxide leading to high performance electrodes.

In a fifth aspect, the invention relates to the use of the supercapacitor according to the first aspect of the invention in a Polymer Electrolyte Membrane (PEM) fuel cell stack.

In a sixth aspect, the invention relates to a PEM fuel cell stack comprising a supercapacitor according to the first aspect of the invention.

In a further aspect, the invention relates to a carbon based electrode for use in a supercapacitor, wherein the carbon electrode is characterized by having a higher affinity towards a non-aqueous solution than towards said aqueous solution.

The first and other aspect and embodiments of the present invention may each be combined with any of the other aspects and embodiments.

Other aspects, embodiments, advantages and novel features of the invention will become more apparent from the following detailed description of the invention when considered in conjunction with the accompanying drawings.

DETAILED DESCRIPTION OF THE SPECIFIC EMBODIMENTS OF THE INVENTION

Gel Electrolyte Stability

Cyclic voltammetry measurement using the two-electrode EL-CELL loaded with two different commercial carbons (Norit® A Supra and Vulcan® XC-72) as electrode materials, were performed using the phosphate buffer, a 1 M $KNO_3$ solution in Milli-Q water and a 1 M $KNO_3$ solution gelled using agar-agar respectively as electrolytes.

The EL-CELL® ECC-AQU is a commercial cell that uses thin 18 mm gold disk electrodes as current collectors and the inner cell parts are made of polyetheretherketone (PEEK). When assembled this cell uses a spring to ensure an even pressure on the system.

The gelled electrolyte was prepares in the following manner:

10 mL of a 1.00 M $KNO_3$ solution in Milli-Q water was added to a small glass beaker, which had been cleaned several times with Milli-Q water, and it was bubbled with argon for more than 30 minutes. Then 100 mg agar-agar (Merck Microbiology) was added to this and the solution was heated to 90° C. while stirred gently using a glass thermometer which had also been cleaned thoroughly by rinsing it with Milli-Q water before use. The hot electrolyte was added directly to the separator during assembly of the cell in a similar fashion as when the measurement cell is used with a normal electrolyte. The assembled cell was then allowed to stand for at least a day before measurement were started to ensure the electrolyte had solidified. It was observed that the surplus electrolyte also had settled into a firm gel after standing at room temperature for a day.

Figure 1:
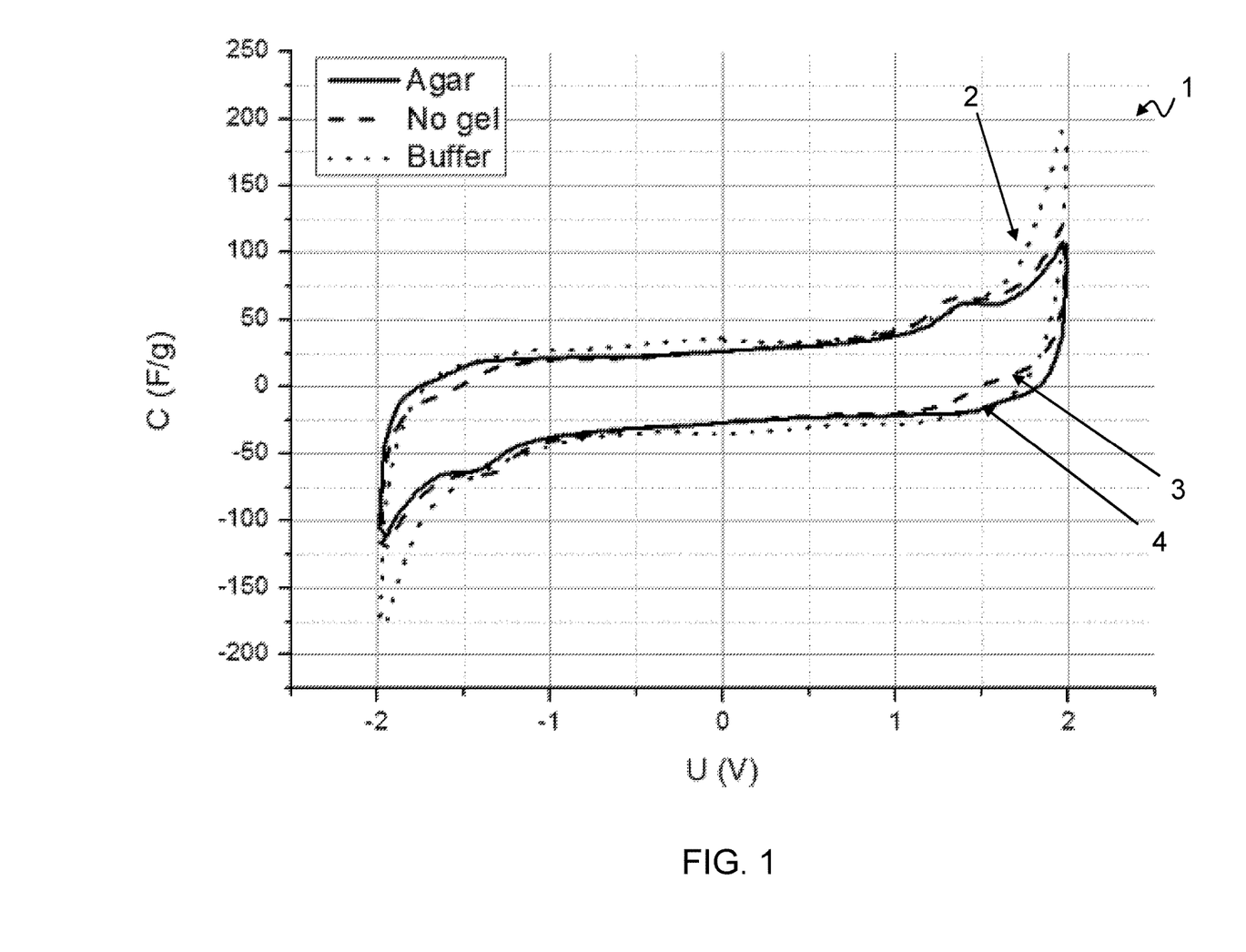
FIG. 1 shows cyclic voltammograms of a two-electrode cell, based on the EL-CELL with gold current collectors coated with Norit® A Supra+20 w % Nafion® binder, and recorded using a scan rate of 10 mV/s.

The results can be seen in the cyclic voltammograms in FIG. 1.

FIG. 1 shows Cyclic voltammograms 1 of a two-electrode cell, based on the EL-CELL with gold current collectors coated with Norit® A Supra+20 w % Nafion® binder, and recorded using a scan rate of 10 mV/s.

The different voltammograms represent different electrolyte types used in this system where voltammogram 2 is a standard phosphate buffer electrolyte, voltammogram 3 is a 1 M $KNO_3$ electrolyte and the voltammogram 4 is the 1 M $KNO_3$ electrolyte which has been gelled using agar-agar.

In FIG. 1 the same trend is seen for the Vulcan® XC-72 based system as it was for the system using Norit® A Supra as electrode material. The non-buffered electrolyte 3 show significantly improved reversibility over the system with buffered electrolyte 2 and the system with gelled electrolyte 4 show even better reversibility. The benefit of the gelled electrolyte is lost at scan rates higher than mV/s in case of the Vulcan® XC-72 based system (not shown). This could indicate that diffusion only reaches a rate where it becomes problematic at lower scan rates for this system. It seems somewhat counter intuitive that this trend is less pronounced in case of the more porous carbon Norit® A Supra, but it could be explained if the stabilizing effect of the gel is mainly on the outer surface of the carbon grains because then structure of the Norit® is actually coarser than that of Vulcan®.

In conclusion, the gelled electrolyte 4 shows a significantly improved reversibility compared to the buffered and not buffered electrolyte.

The reversibility is a good indication of the stability of the system in the given voltage range.

Hybrid Electrolyte

Hybrid A

A hybrid electrolyte was made by mixing 2 mL of the 1 M $NaClO_4$ in propylene carbonate with 2 mL of a 1 M $NaClO_4$ in Milli-Q water solution in a 5 mL glass vial and deaerating this solution for 10 minutes by bubbling argon through it. The EL-CELL were then assembled using gold current collectors coated with C2 carbon+w % Nafion® binder (suspension 12) and an 18 mm fiberglass separator (Whatman GF/D) to which 300 μL of the freshly deaerated hybrid electrolyte was added during assembly.

This system was studied using cyclic voltammetry. Then a similar system using only pure 1 M $NaClO_4$ in Milli-Q water as electrolyte were made and studied using the exact same protocol.

To test the hypothesis that propylene carbonate in fact can be used to dilute water without an equal proportion of the pH active species distributing in it, dilution experiment of a 1 M aqueous $HClO_4$ solution was performed. In this experiment the pH value was measured using a freshly calibrated Radiometer PHM210 pH-meter with a glass electrode (Mettler Toledo InLab® Routine). First a dilution series using Milli-Q water was performed by a ten times dilution giving a 0.1 M acid solution which resulted in the expected pH increase of around 1. This was then dilutes further ten times to give a 0.01 M acid solution and the pH value again increased with the expected 1. A similar dilution series where propylene carbonate was used instead of Milli-Q water was performed. Here the first dilution step resulted in a significantly smaller pH increase compared to the water dilution and the second step resulted in a large decrease in measured pH. Actually the pH decrease of the second dilution step was so large that it was out of range of the system.

Hybrid B

In an attempt to solve the problem with the Nafion® based coatings being dissolved by the propylene carbonate, a suspension of C2 carbon using 20 w % PolyIsoButylene (PIB, BASF Oppanol® N50) as binder and Hexan (CHROMASOLV® for HPLC≥97.0%) as solvent, was prepared using the same protocol as with the Nafion® based suspensions. This suspension was less stable than the typical Nafion® based suspensions which could be explained by the fact that no dispersion aiding additives were used in this new suspension and the resulted coatings were also less mechanical stable. Despite these disadvantages it was decided to use this type of coating for a hybrid electrolyte experiment because it was expected that the PIB would be less affected by the propylene carbonate than Nafion®.

A 1 w % agar-agar gel electrolyte based on 1 M $NaClO_4$ in Milli-Q water was prepared in a similar fashion as previously:

10 mL of a 1.00 M $KNO_3$ solution in Milli-Q water was added to a small glass beaker, which had been cleaned several times with Milli-Q water, and it was bubbled with argon for more than 30 minutes. Then 100 mg agar-agar (Merck Microbiology) was added to this and the solution was heated to 90° C. while stirred gently using a glass thermometer which had also been cleaned thoroughly by rinsing it with Milli-Q water before use.

300 μL of this electrolyte was added to an 18 mm fiberglass separator (Whatman GF/D) and this was allowed to cool down and gel for 15 minutes. Then one of the gold current collectors coated with PIB bound C2 carbon was inserted in the freshly cleaned EL-CELL. To this a few small drops of the 1 M $NaClO_4$ in propylene carbonate was added. The propylene carbonate soaked fairly easily into the carbon, but when the separator was inserted it was clear that some of the carbon coating were dissolved by the propylene carbonate. On top of the separator a small amount of the propylene carbonate electrolyte was added and the second current collector, which had been coated in a similar fashion as the first, was swiftly added on top of this and the cell closed. The behaviour of this system (Hybrid B) can be seen in FIG. 2, compared with the pure aqueous electrolyte and the hybrid based on the mixed electrolyte (Hybrid A).

Figure 2:
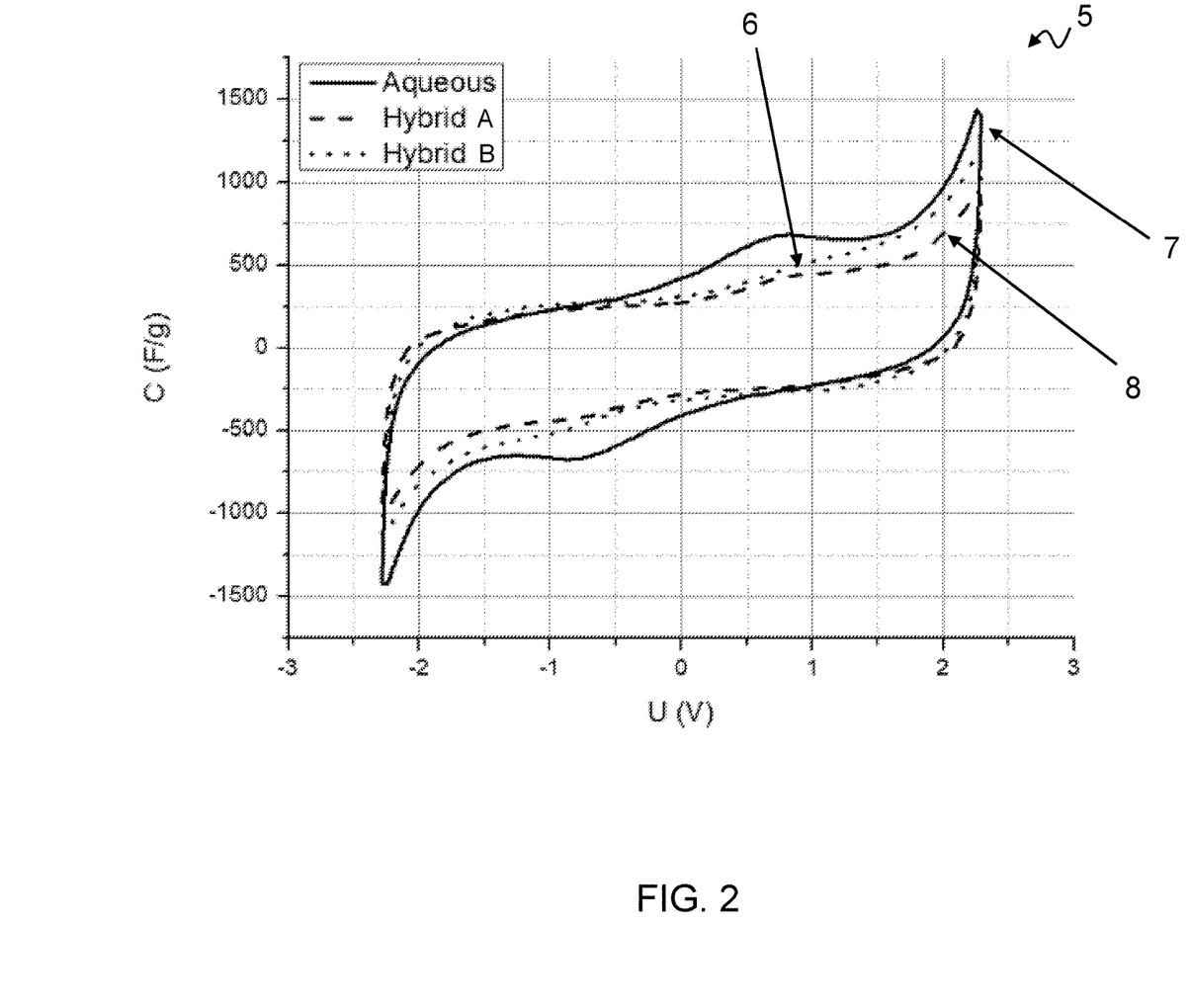
FIG. 2 shows cyclic voltammograms of the two-electrode EL-CELL loaded with C2 carbon+20 w % PolyIsoButylene (PIB) measured using a hybrid electrolyte system.

FIG. 2 shows cyclic voltammograms of the two-electrode EL-CELL loaded with C2 carbon+20 w % PIB measured using a hybrid electrolyte system with a small amount of propylene carbonate based electrolyte on the electrodes separated by a gelled aqueous electrolyte 6 (Hybrid B), compared to the previous experiments based on aqueous electrolyte 7 and the hybrid electrolyte A, voltammogram 8. All of the voltammograms are recorded at a scan rate of 10 mV/s.

Galvanostatic charge-discharge measurements were also done on this hybrid (Hybrid B). The equivalent specific discharge capacitance as a result of using different voltage windows and the calculated theoretical energy density can be seen in Table 1 and an example of a charge-discharge curve can be seen in FIG. 3.

TABLE 1

Results of the galavanostatic charge-discharge measurement of Hybrid B using a discharge current of 10 mA.

| Charge voltage (V) | Equivalent Capacitance (F/g) | Maximum energy density (Wh/kg) |
|---|---|---|
| 1.2 | 200.9 | 10.0 |
| 2.0 | 204.0 | 28.3 |
| 2.3 | 215.0 | 39.5 |
| 2.5 | 210.1 | 45.6 |

As it can be seen from the result in Table 1, the capacitance of the hybrid system actually increases with higher charge voltage up to 2.3 V under a moderate discharge current of 10 mA. Even though the capacitance decreases slightly when the system is charged to 2.5 V, the stored energy by the system becomes larger.

It should however be noted that the decreasing capacitance strongly indicates that the system is going past its limit when operating at 2.5 V and the loss of capacitance could be explained by loss of available surface area due to oxidation or gas formation.

Figure 3:
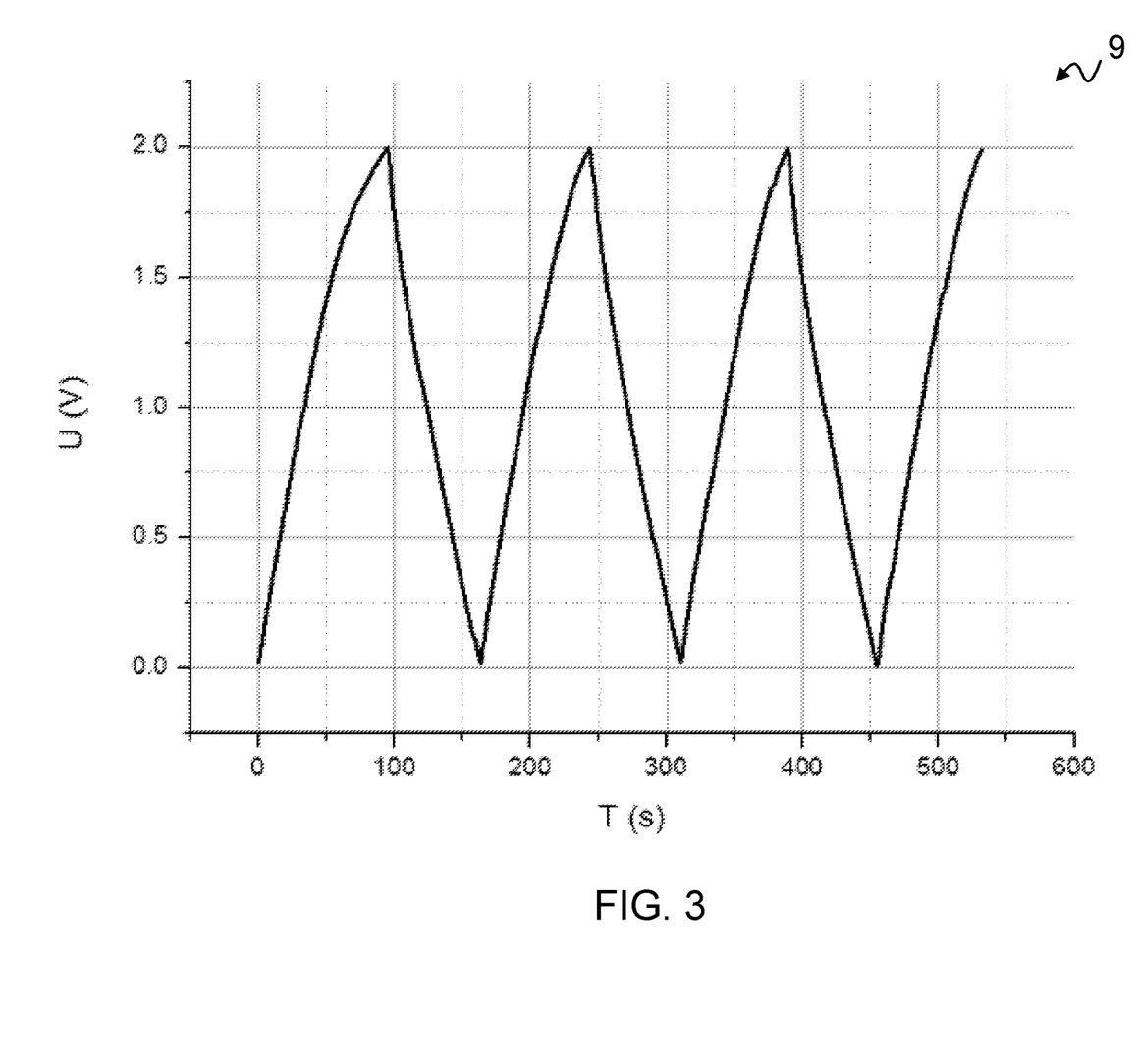
FIG. 3 shows Galvanostatic charge-discharge curve of the two-electrode EL-CELL loaded with C2 carbon+20 w % PIB measured using a hybrid electrolyte system with a small amount of propylene carbonate based electrolyte on the electrodes separated by a gelled aqueous electrolyte (Hybrid B).

FIG. 3 shows Galvanostatic charge-discharge curve 9 of the two-electrode EL-CELL loaded with C2 carbon+20 w % PIB measured using a hybrid electrolyte system with a small amount of propylene carbonate based electrolyte on the electrodes separated by a gelled aqueous electrolyte (Hybrid B), measured at a current of 10 mA.

As it can be seen in FIG. 3 the first charge cycle takes longer time than the rest. This is most likely because the system is adapting to new operational conditions because it is operated at a fixed polarity. The mechanism behind this adaption could actually also be local pH changes which do not have to revert completely because the electrodes are only operated at a smaller potential range. The adaption can also be due to an oxidation of the positive electrode if that is the electrode reaching its potential limit first. The reason why oxidation of the positive electrode can stabilize the system can be explained by an increased capacitance of the positive electrode as a result of either increased porosity or redox active surface groups. The increased capacitance of the positive electrode results in smaller potential changes of that electrode during charging and discharging.

In conclusion, the pH effect can be magnified by the use of hybrid electrolytes where a part of the water in the electrolyte solution is replaced by another solvent.

This idea has been further developed by introducing electrode materials with a specific affinity towards the added solvent which is believed to results in a local increase in the concentration ratio between the alternative solvent and water in the electrode-electrolyte interface thereby increasing the pH effect even more.

Carbon Based Electrodes

Pistachio nutshells from pistachio nuts with unknown origin purchased in a Danish grocery store was crushed in to small pieces in a porcelain mortar chosen as a carbon source.

These were first pyrolyzed at 300° C. and the resulting char was then further activated. Half of the char was treated with a calcium chloride solution before activation to see the effect of this common treatment step.

The hard part of the shells of 8.047 g pistachio shells was placed in an alumina crucible. This crucible was inserted into the middle of the working tube of a horizontal tube furnace (Lenton LTF 16/--/180) and argon (ARCAL Prime) was passed through the tube with a flowrate of around 50 ml/min. Then the sample was heated to 300° C. with a heating rate of 120° C./h and maintained at that temperature for 5 h before it was allowed to cool down at a rate of 60° C./h. The argon flow was turned off several hours later. Then the crucible with the pyrolyzed shells was taken out of the furnace. The shells had a weight of 3.4572 g. 10 g of a 25 w % calcium chloride solution in Milli-Q water was prepared in a 50 mL glass beaker. The carbonized shells were crushed into a uniform powder using a porcelain mortar. 1.50 g of this was added to the beaker with the calcium chloride solution and the mixture was stirred by hand and then allowed to stand for 20 h during the night. The rest of the carbonized shell powder was stored in a glass vial. The carbon in the calcium chloride was filtered and washed several times with Milli-Q water and allowed to dry on the filter paper at 110° C. in a drying oven during the night before being taken out and allowed to cool down. 1.4337 g of the pistachio carbon which had been soaked in the calcium chloride solution was transferred to the mortar and ground. To this, 5.8649 g of potassium hydroxide (SIGMA-ALDRICH, puriss. p.a., Reag. Ph. Eur.≥85%, pellets) was added and the carbon and potassium hydroxide was mixed and transferred to an alumina crucible.

1.4861 g of the untreated carbonized shell powder was transferred to the porcelain mortar and ground. To this 5.9327 g of similar potassium hydroxide pellets was added and the carbon and potassium hydroxide was mixed and transferred to another alumina crucible.

The two crucibles with carbon powder and potassium hydroxide were placed in larger crucibles to avoid overspill and these were inserted into the middle of the working tube of a horizontal tube furnace (Lenton LTF 16/--/180). Argon (ARCAL Prime) was passed through the tube with a flowrate of around 50 ml/min and the two crucibles were heated to 800° C. with a heating rate of 300° C./h and maintained at that temperature for 1 h before being allowed to cool down at a rate of 180° C./h. The argon flow was switched of several hours later when the oven had reached room temperature. Then the crucibles with the activated carbons were taken out of the furnace. The product of the carbon without calcium chloride treatment was denoted C1 and the product which had been soaked in the calcium chloride solution was denoted C2. Both product were ground using a porcelain mortar and then purified by first rinsing them with 300-400 mL demineralized water on a Buchner funnel followed by 100-150 mL Milli-Q water. The washed products were dried using a drying oven at 110° C. for several days. The final product was characterized both electrochemically using two-electrode cyclic voltammetry and physically using BET and XPS.

BET Analysis

BET analysis was done using a Micromeritics TriStar II. The calculated specific surface areas are based on the mass of carbon before complete drying in vacuum which means that the values will be a little underestimated. It was decided that this was the best compromise because some carbon was lost due to spray because of static electricity when the dried carbon was taken out of the glass tube for a post drying weight measure. The calculations were done using the build in routines in the software based on measurements in a pressure range from 0.05-0.3 relative pressure (P/P0). A summary of the results can be seen in Table 2.

TABLE 2

Results of the BET analysis of the activated carbon materials C1 and C2.

| Material: | Pistachio shell based, KOH activated, carbon without $CaCl_2$ treatment (C1) | Pistachio shell based, KOH activated, carbon with $CaCl_2$ treatment (C2) |
|---|---|---|
| BET Surface Area: | 1325 ± 16 m2/g | 2433 ± 36 m2/g |
| C-value: | −512.734851 | 296.957216 |
| Correlation Coeff:: | 0.9993287 | 0.9989305 |

XPS Analysis

XPS analysis was done on the two final activated materials using the XPS equipment at University of Southern Denmark consisting of a Phoibos-10 analyser from SPECS (Germany) with five channeltrons. The result of the survey scans where that the surface of C1 contained 90.9 at % carbon+potassium and 9.1 at % oxygen while the surface of C2 contained 89.4 at % carbon+potassium and 10.6 at % oxygen. This indicates that the surface chemistry of these materials is reasonably similar. From the deconvolution of the C1s peaks of the two carbon materials it was found that the peak of C1 contained a small contribution from potassium (K2p) of around 2.0 at % of the carbon or around 1.8 at % of the surface and the peak of C2 also contained a small contribution from potassium (K2p) of around 1.6 at % of the carbon or around 1.4 at % of the surface.

Cyclic Voltammetry

Cyclic voltammetry was done using a Zahner Zennium electrochemical workstation and an EL-Cell ECC-Aqu for two-electrode measurements.

Two-Electrode Measurements

All specific capacitances are in this case calculated from the mass of carbon suspension added to the electrodes and its concentration of carbon. The mass of binder and the capacitive contribution from the current collectors is omitted in the calculations. The electrolyte used is a 0.5 M $KH_2PO_4$ and 0.5 M $K_2HPO_4$ buffer solution in Milli-Q water.

The use of this potassium hydroxide based activation instead of a carbon dioxide activation procedure gave an increase in BET surface area from 396 to 1325 $m^2/g$ and an increase in specific capacitance from under 10 to around 150 F/g, thus clearly showing the much larger effectivity of this activation procedure. It was also found that the treatment of the char using a calcium chloride solution before the activation step resulted a further increase of the BET surface area to 2433 $m^2/g$ and an increase in specific capacitance to more than 200 F/g. The cyclic voltammograms of the calcium chloride treated carbon material also show less tilting and less change in capacitance with changing scan rate indicating less serial resistance and a porosity that allows for better ion transport. All this shows that the calcium chloride treatment is in fact very beneficial. The chemical composition of the surface determined by XPS was very similar for these two materials. The XPS analysis of both materials also indicates a 1-2 at % potassium content, which is most likely origination from the activation agent.

Figure 4:
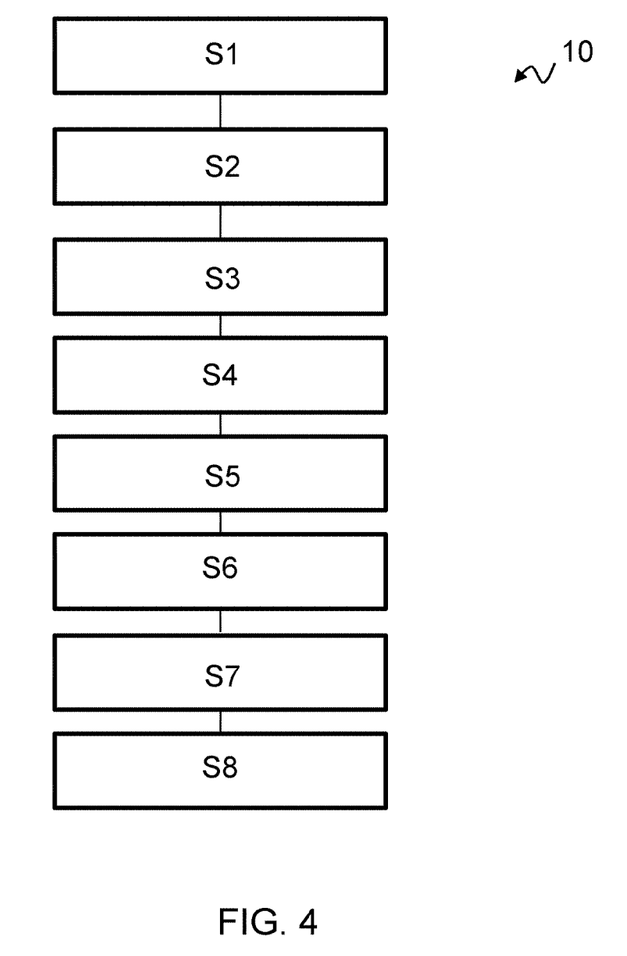
FIG. 4 shows the method of producing the carbon based electrode.

FIG. 4 shows the method of producing the carbon based electrode comprising:

(S1) providing a carbon precursor, such as a structured source of cellulose or lignin;

(S2) mechanically processing the structured source of cellulose or lignin;

(S3) thermally processing said structured source of cellulose or lignin by exposing the structured source of cellulose or lignin to heat up to 300° C. for a desired period of time in inert atmosphere, thereby forming char;

(S4) mechanically and chemically treating the char;

(S5) activating the char by exposing said char to potassium hydroxide in presence of to heat up to 900° C. for a desired period of time in inert atmosphere, thereby forming activated carbon;

(S6) cooling the activated carbon to room temperature;

(S7) treating said activated carbon with water; and (S8) drying said activated carbon.

The invention claimed is:

1. A supercapacitor comprising an electrolyte, said electrolyte comprising a mixture of water, one or more non-aqueous solvent and a salt forming a mixture of an aqueous solution and a non-aqueous solution; wherein
said non-aqueous solution has a larger electrochemical stability window than said aqueous solution;
said salt has a solubility above 0.1M in water and/or in said one or more non-aqueous solvent between −25 and 100° C.;
said mixture has a buffer capacity ☐ lower than $10^{-5}$;
hydron ($H^+$) and hydroxide ion ($OH^-$) solubility is lower in said non-aqueous solution than in said aqueous solution;
wherein the ratio vol/vol between said aqueous solution and said non-aqueous solution is in the range between 100:1 and 1:1;
said supercapacitor further comprising two electrodes and wherein said electrolyte is located between said two electrodes, wherein said two electrodes have a higher affinity towards said non-aqueous solution than towards said aqueous solution.

2. A supercapacitor according to claim 1, wherein said electrolyte is or comprises a gel electrolyte.

3. A supercapacitor according to claim 1, wherein said one or more non-aqueous solvent comprises a polar organic solvent.

4. A supercapacitor according to claim 1, wherein said salt comprises cations selected from the group comprising alkali metal or alkaline metal earth, such as $Li^+$, $Na^+$, $K^+$, $Be^{2+}$, $Mg^{2+}$, $Ca^{2+}$, $Sr^+$, or $NH_4^+$ and anions selected from the group comprising $F^-$, $Cl^-$, $Br^-$, $I^-$, $NO_3^-$, $ClO4^-$, $HSO_4^-$, $PF_6^+$, $BF_4^-$ and $SO_4^{2-}$.

5. A supercapacitor according to claim 1 wherein said two electrodes are carbon based electrodes.

6. A supercapacitor according to claim 5, wherein said carbon based electrodes comprise carbon based materials selected from carbon particles, nanotubes, aerogel or fibres, graphene, carbon black, activated carbon or carbides.

7. A supercapacitor according to claim 1, wherein said two electrodes are in contact with said non-aqueous solution.

8. A supercapacitor according to claim 7, wherein said two electrodes in contact with said non-aqueous solution are separated by said aqueous solution.

9. A method of increasing the voltage range of an aqueous electrolyte for use in a supercapacitor according to claim 1, said method comprising:
producing an electrolyte by mixing water, one or more non-aqueous solvent and a salt forming a mixture of an aqueous solution and a non-aqueous solution.

10. A method according to claim 9, wherein
said non-aqueous solution has a larger electrochemical stability window than said aqueous solution;
said salt has a solubility above 0.1M in water and/or in said one or more non-aqueous solvent between −25 and 100° C.;
said mixture has a buffer capacity ☐ lower than $10^{-5}$;
hydron ($H^+$) and hydroxide ion ($OH^-$) solubility is lower in said non-aqueous solution than in said aqueous solution.

11. A carbon based electrode for use in a supercapacitor according to claim 1, wherein said carbon electrode is characterized by having a higher affinity towards said non-aqueous solution than towards said aqueous solution.

12. A method of producing said carbon based electrode according to claim 11, the method comprising:
providing a carbon precursor, such as a structured source of cellulose or lignin;
mechanically processing said structured source of cellulose or lignin;
thermally processing said structured source of cellulose or lignin by exposing said structured source of cellulose or lignin to heat up to 300° C. for a desired period of time in inert atmosphere, thereby forming char;
mechanically and chemically treating said char;
activating said char by exposing said char to potassium hydroxide in presence of to heat up to 900° C. for a desired period of time in inert atmosphere, thereby forming activated carbon;
cooling said activated carbon to room temperature;
treating said activated carbon with water; and
drying said activated carbon.

13. A Polymer Electrolyte Membrane (PEM) fuel cell stack comprising a supercapacitor according to claim 1.

14. A supercapacitor according to claim 3, wherein the polar organic solvent comprises propylene carbonate.

15. A supercapacitor according to claim 7, wherein said two electrodes are surrounded by said non-aqueous solution.

* * * * *

UNITED STATES PATENT AND TRADEMARK OFFICE
CERTIFICATE OF CORRECTION

PATENT NO. : 10,685,790 B2  
APPLICATION NO. : 16/308846  
DATED : June 16, 2020  
INVENTOR(S) : Vindt et al.

Page 1 of 1

It is certified that error appears in the above-identified patent and that said Letters Patent is hereby corrected as shown below:

On the Title Page

At item (54) on last line of title, delete "SUPRCAPACITOR" insert --SUPERCAPACITOR--

In the Specification

At Column 1, Line 4, delete "SUPRCAPACITOR" insert --SUPERCAPACITOR--

In the Claims

At Column 15, Line 27, delete "□" insert --$\beta$--

At Column 15, Line 47, delete "$Sr^+$," insert --$Sr^{2+}$,--

At Column 16, Line 20, delete "□" insert --$\beta$--

At Column 16, Line 40, delete "to"

Signed and Sealed this  
Twenty-fifth Day of August, 2020

Andrei Iancu  
*Director of the United States Patent and Trademark Office*